INVENTOR:
KENNETH G. HELLER
BY
ATTORNEYS

Aug. 23, 1966     K. G. HELLER     3,267,665
PROPORTIONAL THRUST-CONTROL VALVE
Original Filed March 14, 1960     2 Sheets-Sheet 2
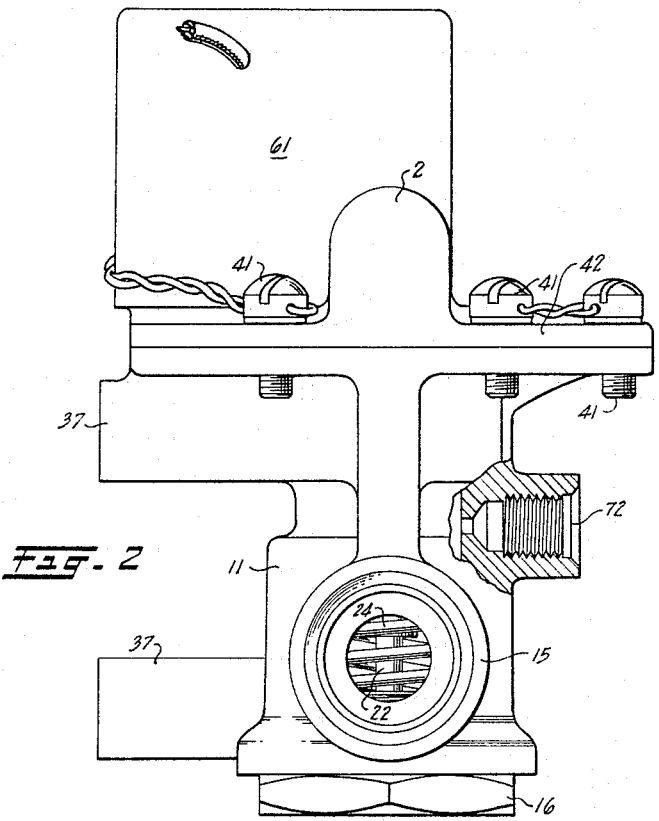
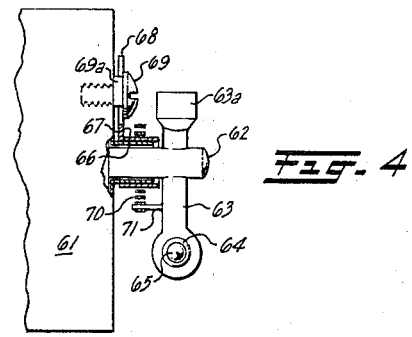
INVENTOR:
KENNETH G. HELLER
BY
ATTORNEYS

United States Patent Office 3,267,665
Patented August 23, 1966

3,267,665
PROPORTIONAL THRUST-CONTROL VALVE
Kenneth G. Heller, Redwood City, Calif., assignor to American Radiator & Standard Sanitary Corporation, New York, N.Y., a corporation of Delaware
Continuation of application Ser. No. 14,649, Mar. 14, 1960. This application Dec. 26, 1962, Ser. No. 248,832
6 Claims. (Cl. 60—35.5)

This application is a continuation of my copending application, Serial No. 14,649, filed March 14, 1960, now abandoned.

This invention relates to and in general has for its object the provision of a unidirectional proportional thrust-control valve suitable, for example, for controlling the attitude of an orbiting vehicle in response to a signal from an attitude-sensor.

In some instances it is desirable to control the attitude of an orbiting vehicle, relative to one of its attitude axes, by mounting a valved jet orifice on said vehicle at an angle to and offset from said axis and connected with a source of fluid pressure, said valve being under the selective control of an attitude-sensor or other command signal.

More specifically, one of the objects of this invention is the provision of a valve of the character above described including a convergent-divergent thrust nozzle arranged to be connected with a source of gaseous pressure through a main regulating valve; and a pilot valve responsive to a demand signal and serving to operate said main valve in response to said demand signal.

Another object of the invention is to provide a system for use in an essentially zero pressure environment such as is encountered by vehicles orbiting around the earth wherein the thrust of a nozzle, open at its outlet to said environment, may be controlled proportionally to a demand signal by varying the pressure at the inlet to said nozzle proportionally to said demand signal.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 2 is a left-hand side elevation of the valve illustrated in FIG. 1.

FIG. 4 is a fragmentary section taken on the section line 4—4 of FIG. 3.

Figure 3:
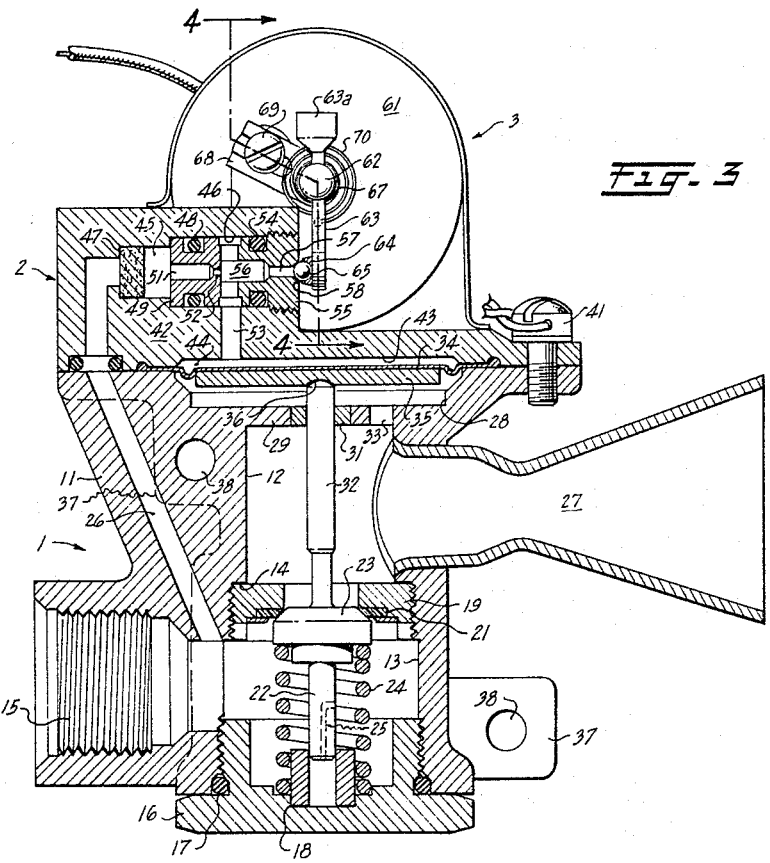
FIG. 3 is a vertical midsection taken on the section line 3—3 of FIG. 1.
Figure 1:
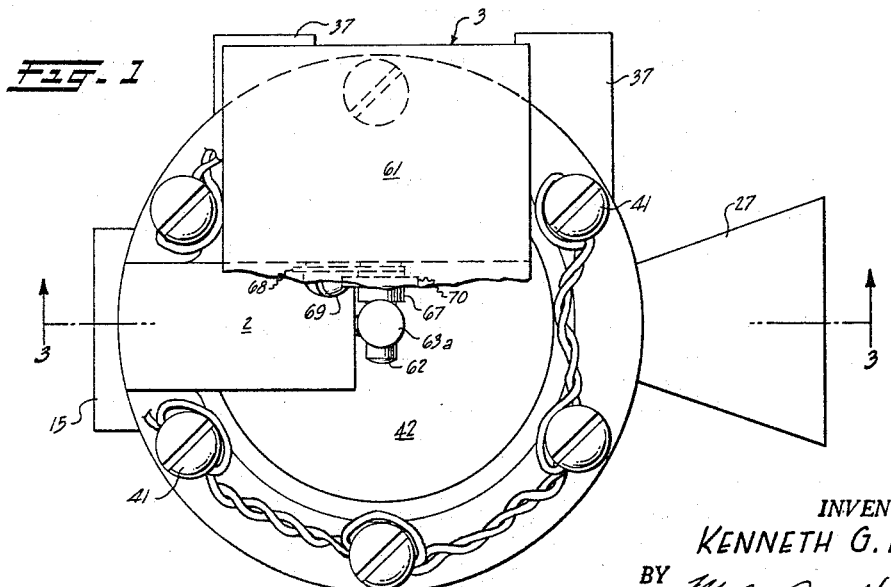
FIG. 1 is a top plan view of a valve embodying the objects of my invention with portions thereof broken away to better illustrate its construction.

In general, the valve shown in these various figures includes a main valve assembly generally indicated by the reference number 1, a pilot valve assembly generally indicated by the reference numeral 2, and a torque motor assembly generally indicated by the reference numeral 3.

MAIN VALVE ASSEMBLY

The main valve assembly 1 includes a valve body 11 formed with a bore 12 and a counterbore 13, the juncture of which forms a valve seat shoulder 14. Formed on one side of the valve body 11 opposite the counterbore 13 is a threaded gas inlet 15 communicating therewith.

Threaded in the lower end of the counterbore 13 is a closure plug 16 sealed to the lower end of the valve body by an O ring 17. Mounted in the plug 16 coaxially therewith is a bushing 18. Threaded into the upper end of the counterbore 13 in engagement with the shoulder 14 is an annular valve seat 19 mounting a gasket 21. Slidably mounted in the bushing 18 is a valve stem 22, and carried on the upper end thereof is a tapered valve closure member 23 arranged to seat on the valve seat 19 and its gasket 21. Surrounding the valve stem 22 is a compression spring 24 seated at its lower end on the plug 16 and secured at its upper end to the valve closure member 23. Formed in the lower end of the valve stem 22 is a gas bleed channel 25, this channel serving to prevent a dashpot action from developing within the bushing 18. Extending between the counterbore 13 and the upper face of the valve body 11 is a gas conduit or passageway 26.

Secured to one side of the valve body 11 in communication with the bore 12 and extending at a right angle therefrom is a convergent-divergent nozzle 27.

Formed in the upper face of the valve body 11 coaxially with the bore 12 is a circular recess 28 separated from the bore 12 by a wall 29. Mounted in the wall 29 coaxially with the bore 12 is a bushing 31, and slidably mounted therein is a valve stem extension 32, the lower end of this extension being fixed to or formed integral with the valve closure member 23. Extending through the wall 29 is a feedback-pressure hole or passageway 33.

Secured and seated to the upper face of the valve body 11 across its circular recess 28 is a flexible diaphragm 34. Fastened to the lower face of the diaphragm 34 is a stiffening disc 35, and formed on the lower face thereof is a bearing socket 36 for the reception of the upper end of the valve stem extension 32.

Formed at spaced points on the valve body 11 are lugs 37 provided with bolt holes 38 for fastening the valve to an orbiting vehicle in any desired predeterminted position relative to one of the attitude axes of the vehicle.

PILOT VALVE ASSEMBLY

Secured to the upper face of valve body 11 by screws 41 is the valve body 42 of the pilot valve assembly. Formed on the lower face of the valve body 42 is a circular recess 43 which, with the upper face of the diaphragm 34, forms an expandable chamber 44.

Provided in the valve body 42 is a bore 45 merging with a counterbore 46. Optionally mounted in the bore 45 is a gas filter 47. Sealed within the counterbore 46 by an O ring 48 is a plug 49 provided with an axial passageway 51 terminating at its right-hand end in a fixed orifice 52. Connecting the sealed expandable chamber 44 with the counterbore 46 at a point to the right of the plug 49 and its orifice 52 is a conduit or passageway 53. Screwed into the right end of the bore 46 and sealed thereto by an O ring 54 is a plug 55 provided with a central passage or conduit 56 terminating in a variable orifice 57 formed with a ball seat 58. The passageway 56 communicates with the fixed orifice 52 and also with the passageway 53 leading to the expandable chamber 44.

MOTOR ASSEMBLY

Mounted on valve body 42 is a direct current torque motor 61 including a shaft 62. Extending transversely through the shaft 62 and fixed thereto is a torque arm 63 provided with a counterweight 63a. Formed on the lower end of the arm 63 (as viewed in FIG. 3) at a point opposite the orifice 51 and its ball seat 58 is a ball retainer 64, and mounted therein is a ball 65 arranged to move in and out of the ball seat 58 and close the orifice 57. Circumscribing the motor shaft 62 with positive clearance and affixed to the end of the casing of the motor 61 is an external bearing sleeve 66. Journaled on the sleeve 66 is a collar 67 provided at its inner end with a bifurcated arm 68. Extending through the bifurcated end of the arm 68 and threaded into the motor casing head is a screw 69 having an eccentric shank 69a. As a result of this construction the rotation of the screw will cause the collar 67 to rotate through a slight arc about the axis of the motor shaft. Surrounding the outer end of the collar 67 is a coil spring 70, the inner end thereof being fixed to the collar 67. The other end of the spring 70 extends outwardly and is anchored to a finger 71 fixed to the torque arm 63. As a result of this construction it is possible to bias the orifice closure ball 65 towards its closing position against the ball seat 58 and, within limits, to adjust the biasing pressure exerted by the coil spring 70 for reasons which will presently appear.

THEORY

Referring now to the convergent-divergent nozzle 27:
Ideal theory shows that the reaction thrust from a fully expanding convergent-divergent nozzle is:

$$F = C_f A_t P_1$$

where F is the thrust force, $A_t$ is the nozzle throat area, $P_1$ is the pressure at the inlet to the nozzle, and $C_f$ is a thrust coefficient given by:

$$C_f = \sqrt{\frac{2K^2}{K-1}\left(\frac{2}{K+1}\right)^{\frac{K+1}{K-1}}\left[1-\left(\frac{P_2}{P_1}\right)^{\frac{K-1}{K}}\right]} + \frac{P_2-P_3}{P_1}\frac{A_2}{A_t}$$

in which K is the ratio of specific heats for the gas under consideration, $P_2$ is the gas pressure at the nozzle exit plane of area $A_2$, and $P_3$ is the ambient pressure.

If $P_3$ is zero as is the case in outer space, it can be shown that $C_f$ is constant for a given nozzle and gas for all values of $P_1$. The thrust F is thus proportional to the product $A_t P_1$. It is then possible to obtain thrust-control by modulating either $A_t$ or $P_1$, or both. Actual nozzle performance is very close to that calculated by ideal theory.

OPERATION OF MAIN VALVE ASSEMBLY

The main valve assembly resembles a pressure-dome and diaphragm-type pressure-reducing valve. Gas admitted under pressure $P_s$ at the inlet port 15 is throttled to a controlled reduced level by the valve closure member 23, which in turn is under the control of variable orifice 57. This controlled outlet pressure of the main valve assembly is the inlet pressure $P_1$ to the nozzle 27.

Regulation occurs by virtue of force balance in the main valve assembly. Gas under the admission pressure $P_s$ passes through the inlet 15 into the conduit 26, and through the conduits 51 and 53 into the expandable chamber 44. This pressure so acting on the diaphragm 34 is balanced at all times by: (a) the upward action of the controlled pressure operating on the lower side of the diaphragm 34 through the feedback passageway 33, (b) the differential pressure operating across the valve closure member 23, and (c) the valve spring 24. In this manner, the controlled reduced pressure will bear a definite equilibrium relationship to the pressure in the expandable chamber or dome 44 at all times. Any tendency of the controlled pressure to deviate from the equilibrium level will cause the diaphragm 34 to react instantly to re-establish equilibrium.

OPERATION OF PILOT VALVE ASSEMBLY

Gas passing through the conduit 51 and the fixed orifice 52 is discharged to atmosphere through the variable orifice 57 (by forcing the torque arm counterclockwise as viewed in FIG. 3). In the steady state, the rate of influx through the fixed orifice 52 is equal to the efflux through the variable orifice 57.

As the gas throttles through the two orifices, the pressure level established in the space between the two (and in the dome or expandable chamber 44) depends upon the relative resistances of the two orifices. By modulating the opening of the variable orifice 57, a variation of the pressure in the chamber 44 is effected.

A demand signal imposed on the motor 61 will bias its torque arm 63 and its associated ball 65 towards the orifice 57 and ball seat 58. The torque arm will thus move towards its closing position until the torque motor force is exactly balanced by the pressure within the dome or expandable chamber 44 acting on the effective area of the ball 65. It is thus seen that a linear proportionality exists between dome pressure and torque-arm force. The proportionality factor is the effective ball area, which remains essentially constant over the limited ball deflections here involved.

Since the variable orifice 57 is here in series with the fixed orifice 52, the pressure within the dome (chamber 44) cannot be reduced to ambient pressure. Even when the ball 65 is fully retracted, a remanent pressure of significant magnitude exists, the specific magnitude depending upon the resistance ratio of the two orifices. For this reason, the biasing or preload spring 70 is resorted to for maintaining a minimum force on the ball 65 corresponding to a dome pressure slightly above the remanent pressure when there is zero electrical demand signal to the torque motor. Thus, any torque-motor force is fully and instantly effective on the dome.

Spring 24, which biases the valve closure member 23 to its closed position, is sized so that its force on the valve closure member is slightly above the force exerted by the remanent pressure in chamber 44. The preload spring 70 is adjusted, at zero demand signal, to provide a pressure in chamber 44 to equalize the force of spring 24, thereby allowing the valve closure member 23 to be closed at zero demand signal, giving zero pressure at the nozzle inlet and outlet, but enabling the valve closure member to be immediately responsive to a rise in pressure in chamber 44 brought about by a demand signal.

Optionally the valve casing 11 may be provided with a threaded connection 72 for telemetering purposes.

Having described my invention, what I claim is:

1. Apparatus for controlling the thrust of a nozzle operating in a zero pressure environment in direct proportional response to a demand signal comprising: a valve body having a pilot conduit arranged to communicate at one end with a source of gas under pressure, said pilot conduit having a constant orifice therein and a variable orifice, the latter of which orifices terminates the other end of said pilot conduit, an expandable chamber having a single expansible portion, means communicating one side of said expansible portion with said pilot conduit intermediate said orifices, signal responsive means for varying the size of said variable orifice in proportion to the magnitude of a demand signal, a main conduit in said valve body having one end arranged to communicate with said source of gas under pressure; a thrust nozzle having an open discharge end and a constant throat area, said thrust nozzle having the inlet end thereof connected to the other end of said main conduit, a normally-closed valve disposed in said main conduit, means responsive to the expansion of said expandable chamber for opening said valve, and means for subjecting the other side of said expansible portion of said expandable chamber to the gaseous pressure of said main conduit at the inlet of said thrust nozzle.

2. Apparatus as set forth in claim 1 wherein said thrust nozzle has a convergent-divergent shape.

3. Apparatus for controlling the thrust of a nozzle operating in a zero pressure environment in direct proportional response to a demand signal comprising: a valve body having a pilot conduit arranged to communicate at one end with a source of gas under pressure, said pilot conduit having a pair of spaced orifices one of which terminates the other end of said pilot conduit, an expandable chamber having a single expansible portion, means communicating one side of said expansible portion with said pilot conduit intermediate said orifices, a torque motor, means including a barrier adjacent said one orifice and movable to and away from said one orifice in response to the operation of said torque motor to vary the effective area of said one orifice, a main conduit in said valve body having one end arranged to communicate with said source of gas under pressure; a thrust nozzle having an open discharge end and a constant throat area, said thrust nozzle having the inlet end thereof connected to the other end of said main conduit, a spring-biased normally-closed valve disposed in said main conduit and including a valve seat and valve closure member, means responsive to the expansion of said expandable chamber for opening said valve, and means for subjecting the other side of said expansible portion of said expandable chamber to the gaseous pressure of said main conduit at the inlet of said thrust nozzle.

4. Apparatus for controlling the thrust of a nozzle operating in a zero pressure environment in direct proportional response to a demand signal comprising: a valve body having a pilot conduit arranged to communicate at one end with a source of gas under pressure, said pilot conduit having a pair of spaced orifices one of which terminates the other end of said pilot conduit, an expandable chamber having a single expansible portion, means communicating one side of said expansible portion with said pilot conduit intermediate said orifices, a barrier adjacent said one orifice and movable to and away from said one orifice to vary the effective area of said one orifice, a main conduit in said valve body having one end arranged to communicate with said source of gas under pressure, a thrust nozzle having an open discharge end and a constant throat area, said thrust nozzle having the inlet end thereof connected to the other end of said main conduit, a valve disposed in said main conduit and including a valve seat and valve closure member, a bias spring biasing said valve closure member to closed position against said valve seat, means responsive to the expansion of said expandable chamber for opening said valve, and means for subjecting the other side of said expansible portion of said expandable chamber to the gaseous pressure of said main conduit at the inlet of said thrust nozzle.

5. Apparatus for controlling the thrust of a nozzle operating in a zero pressure environment in direct proportional response to a demand signal comprising: a valve body having a pilot conduit arranged to communicate at one end with a source of gas under pressure, said pilot conduit having a pair of spaced orifices one of which terminates the other end of said pilot conduit, an expandable chamber having a single expansible portion, means communicating one side of said expansible portion with said pilot conduit intermediate said orifices, a torque motor, means including a barrier adjacent said one orifice and movable to and away from said one orifice in response to the operation of said torque motor to vary the effective area of said one orifice, a main conduit in said valve body having one end arranged to communicate with said source of gas under pressure; a thrust nozzle having an open discharge end and a constant throat area, said thrust nozzle having the inlet end thereof connected to the other end of said main conduit, a valve disposed in said main conduit and including a valve seat and valve closure member, a bias spring biasing said valve closure member to closed position against said valve seat, means responsive to the expansion of said expandable chamber for opening said valve, means for subjecting the other side of said expansible portion of said expandable chamber to the gaseous pressure of said main conduit at the inlet of said thrust nozzle, and a preload spring biasing said barrier towards said one orifice to provide a pressure in said pilot conduit between said orifices and in said expandable chamber when said pilot conduit is communicated to a source of gas under pressure which is higher than if said barrier were absent, said bias spring being sized so that it balances the bias force on said valve closure member with the pressure in said expandable chamber resulting from the effect of said preload spring.

6. A proportional valve comprising: a valve body having a pilot conduit arranged to communicate at one end with a source of gas under pressure, said pilot conduit having a pair of spaced orifices one of which terminates the other end of said pilot conduit, an expandable chamber having a single expansible portion, means communicating one side of said expansible portion with said pilot conduit intermediate said orifices, a barrier adjacent said one orifice and movable to and away from said one orifice to vary the effective area of said one orifice, a main conduit in said valve body having one end arranged to communicate with said source of gas under pressure; a valve disposed in said main conduit and including a valve seat and valve closure member, a bias spring biasing said valve closure member to closed position against said valve seat, means responsive to the expansion of said expandable chamber for opening said valve, means for subjecting the other side of said expansible portion of said expandable chamber to the gaseous pressure of said main conduit at the discharge side of said valve closure member, and a preload spring biasing said barrier towards said one orifice to provide a pressure in said pilot conduit between said orifices and in said expandable chamber when said pilot conduit is communicated to a source of gas under pressure which is higher than if said barrier were absent, said bias spring being sized so that it balances the bias force on said valve closure member with the pressure in said expandable chamber resulting from the effect of said preload spring.

References Cited by the Examiner

UNITED STATES PATENTS

| 2,309,848 | 2/1943 | King | 251—28 X |
| 2,780,230 | 2/1957 | Freeman | 137—85 |
| 3,015,210 | 1/1962 | Williamson et al. | 60—35.54 |
| 3,058,304 | 10/1962 | Corbett | 60—35.55 |

FOREIGN PATENTS 610,143  10/1948  Great Britain.

OTHER REFERENCES

Nullmatic Derivative Unit, Model 59R–59D, Moore Products Co., Philadelphia, Pa., bulletin 506, 1948.

MARK NEWMAN, *Primary Examiner.*

ABRAM BLUM, *Examiner.*

W. A. SCHUETZ, R. D. BLAKESLEE,
*Assistant Examiners.*